United States Patent [19]
Greek, Jr. et al.

[11] 3,755,784
[45] Aug. 28, 1973

[54] SYSTEM FOR REVISION LINE RETRIEVAL

[75] Inventors: John C. Greek, Jr.; Howard C. Tanner, both of Austin, Tex.

[73] Assignee: International Business Corporation, Armonk, N.Y.

[22] Filed: Feb. 1, 1972

[21] Appl. No.: 222,513

[52] U.S. Cl. .......... 340/172.5
[51] Int. Cl. .......... G06f 3/10, G06f 7/00
[58] Field of Search .......... 340/172.5

[56] References Cited

UNITED STATES PATENTS

| | | | |
|---|---|---|---|
| 3,235,848 | 2/1966 | King et al. | 340/172.5 |
| 3,501,746 | 3/1970 | Vosbury | 340/172.5 |
| 3,248,705 | 4/1966 | Dammann et al. | 340/172.5 |
| 3,289,176 | 11/1966 | Garth, Jr. et al. | 340/172.5 |
| 3,454,929 | 7/1969 | Hynes et al. | 340/172.5 |
| 3,602,901 | 8/1971 | Dixson Teh-Chao Jen | 340/172.5 |
| 3,618,032 | 11/1972 | Goldsberry et al. | 340/172.5 |

*Primary Examiner*—Paul J. Henon
*Assistant Examiner*—Melvin B. Chapnick
*Attorney*—James H. Barksdale, Jr. et al.

[57] ABSTRACT

A system for locating a retrieving a particular line of text stored in a shift register memory. The system includes an input/output typewriter in electronic association with a dynamic shift register and two one-character registers. One of the one-character registers is a query register and the other a hold register. A line of text stored in memory along with other lines is located for printout and revision by entering a search mode and keying query characters representative of a revision point in the line. The revision point can be a misspelled word. A keyed query character representative of the first character making up the revision point is input into the query register. When matches among corresponding characters are found in memory they are replaced with match flags. These match flags define the next characters in memory which are to be compared with the next keyed query character. Spaces define the next characters in memory when the search mode is entered. After the second query character is keyed it is held in the query register and the first keyed character is transferred to the hold register. The match flags in memory are then sequentially replaced with the first keyed character from the hold register and the character following each of the replaced match flags is compared with the second keyed character held in the query register. When matches again occur, the matched characters are replaced with match flags. This operational sequence continues until terminated by the operator, whereupon an operation flag existing in memory is repositioned at the beginning of the first line containing at least one match flag and that line is printed out.

11 Claims, 18 Drawing Figures

---data codes and comparison codes in---CR

---coded information and control codes---CR

---a single data code input to a decode---CR

FIG. 7

---data dodea and comparison dodea in---CR

---doded information and control dodes---CR

---a single data dode input to a decode---CR

FIG. 8

| KEYED CHARACTER | REVISION POINT | QUERY REGISTER | HOLD REGISTER |
|---|---|---|---|
| d | Modea | d | — |
| o | dMdea | o | d |
| d | doMea | d | o |
| e | dodMa | e | d |
| a | dodeM | a | e |
| QUERY END | | | a |
| | dodea | | |

FIG. 9

SYSTEM FOR REVISION LINE RETRIEVAL

CROSS-REFERENCE TO RELATED APPLICATIONS

U. S. Pat. No. 3,675,216, filed Jan. 8, 1971 and issued July 4, 1972, entitled "No Clock Shift Register and Control Technique", having R. L. James as inventor.

U. S. patent application Ser. No. 158,346, filed June 30, 1971, entitled "Machine Log System" having F. T. May as inventor.

U. S. patent application Ser. No. 158,347, filed June 30, 1971, entitled "Data Flow in a Machine Log System", having R. D. Lindsey et al. as inventors.

U. S. patent application Ser. No. 194,418, filed Nov. 1, 1971, entitled "System for Merging Data Flow", having R. G. Bluethman et al. as inventors.

U. S. patent application Ser. No. 214,370, filed Dec. 30, 1971, entitled "System for Arranging and Sharing Shift Register Memory", having R. D. Lindsey et al. as inventors.

U. S. patent application Ser. No. 214,369, filed Dec. 30, 1971, entitled "System for Performing Multiple Operations", having R. G. Bluethman as inventor.

U. S. patent application Ser. No. 229,998, filed Feb. 29, 1972, entitled "System for Obtaining Correspondence Between Memory and Output", having R. G. Bluethman et al. as inventors.

BACKGROUND OF THE INVENTION

1. Field of the Invention

This invention relates generally to search and information retrieval systems, and more specifically to a system for locating and retrieving a particular line of text stored in a storage means along with a number of lines of text.

2. Description of the Prior Art

Heretofore, there has been no rapid and efficient means for locating a revision point in stored text. Either a number of time consuming mental steps are involved in comparing a draft copy with the printout, or printout is continually interrupted for revision decisions. Even after revision operations have been performed during printout, a second printout is often required. Representative of the closest known prior art are IBM Technical Disclosure Bulletin, Vol. 14, No. 3, August, 1971, page 716, and U. S. Pat. No. 3,386,553 to Whitesel. In the IBM TDB a comparison of an incorrect draft with present printout of the first word of each line facilitates the locating of the line to be revised. When the line to be revised is located, the first word printout operation is terminated and a revision operation is initiated. Whitesel discloses a comparison system for interrupting output when a match occurs between a query and stored text. Output comprises the printout of a clean copy and this printout continues until a revision point is detected. More specifically, a query is stored and compared during printout with the stored text. When a match occurs, printout is stopped and a determination is made as to whether the desired location has been reached for revision purposes.

SUMMARY OF THE INVENTION

A storage means controlled by system control logic is in electronic association with an input/output typewriter and first and second character registers. A particular line stored in the storage means along with a number of other lines is located for revision purposes by keying query characters on the typewriter to identify a revision point in the line. Each keyed query character is first held in the first character register and sequentially compared with corresponding characters in each of the stored lines. When matches occur in the stored lines they are replaced with control codes which identify the next character to be compared with another query character. When control codes are input into the stored lines, the query character held in the first character register is transferred to the second character register. Upon subsequent matches, the character in the second character register is input into the storage means and written over the control codes. The subsequent matches are then replaced with new control codes. This operational sequence continues until terminated and then a line containing at least one control code is printed out for revision purposes.

BRIEF DESCRIPTION OF THE DRAWING

FIG. 7 is a drawing illustrating the correct text to be included in the shift register memory after revision;

FIG. 8 is a drawing illustrating incorrectly stored text in the shift register memory;

FIG. 9 is a graphic illustration of the technique of locating the errors in FIG. 8;

DESCRIPTION OF THE PREFERRED EMBODIMENT

Figure 1:
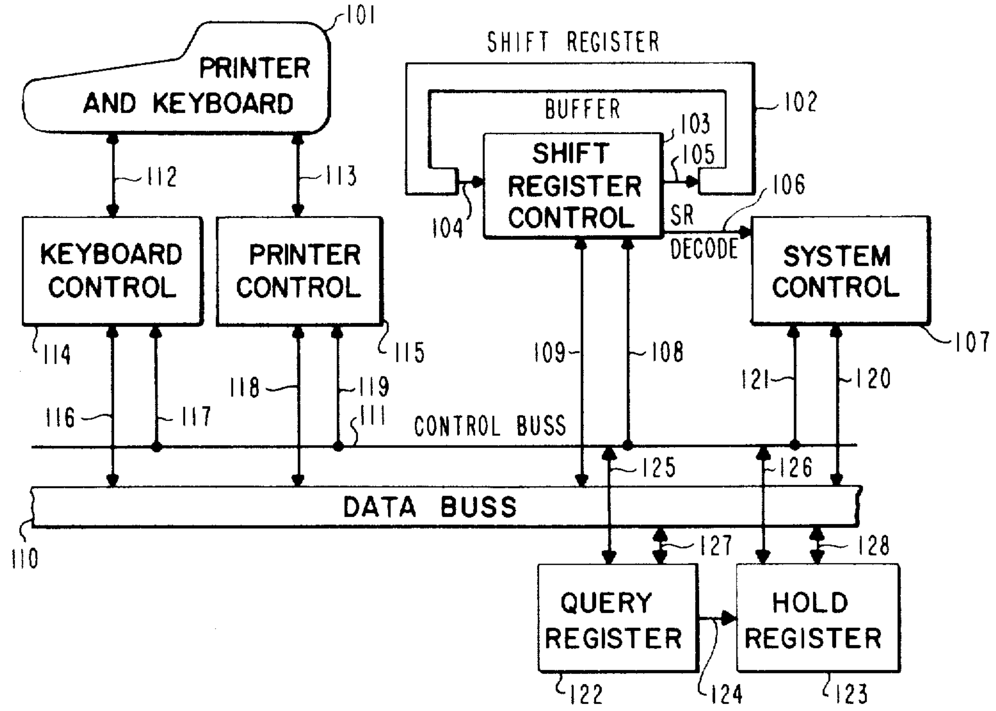
FIG. 1 is an overall block diagram illustrating the various control circuits utilized along with a typewriter buffer.

For a more detailed description of the invention, reference is first made to FIG. 1 wherein there is shown an input/output typewriter 101 in communication with a buffer 102 through controls 114 and 115. Buffer 102 is an electronic dynamic shift register and is controlled by the control logic, or shift register control 103. Control 103 receives the output from the output stage of buffer 102 along line 104 and provides an input to the input stage of buffer 102 along line 105.

The typewriter 101 is in two way communication with the keyboard control unit 114 along line 112 and with printer control unit 115 along line 113. Keyboard control 114 and printer control 115 are also in two way communication with the data buss 110 along lines 116 and 118, respectively. Data buss 110 is also in two way communication with the shift register control 103 along line 109 and the system control logic 107 along line 120. The control buss 111 is in two way communication with keyboard control unit 114 along line 117, printer control unit 115 along line 119, shift register control logic 103 along line 108, and system control logic 107 along line 121. System control logic 107 receives decoded data from shift register control 103 along line 106. A query register 122 is in two way communication along line 127 with data buss 110 and along line 125 with control buss 111. A hold register 123 receives the output from query register 122 along line 124. Further, hold register 123 is in two way communication with data buss 110 along line 128 and with control buss 111 along line 126.

Broadly, reference to input operations is to be taken as a write-over operation where, for example, a match flag is written over a character. Insert operations include the insertion of control codes such as the operation flag into the data flow, and delete operations include writing over data codes with delete codes. Output operations include the reading of data codes in the shift register memory and the printout or other output of these data codes.

Figure 2:
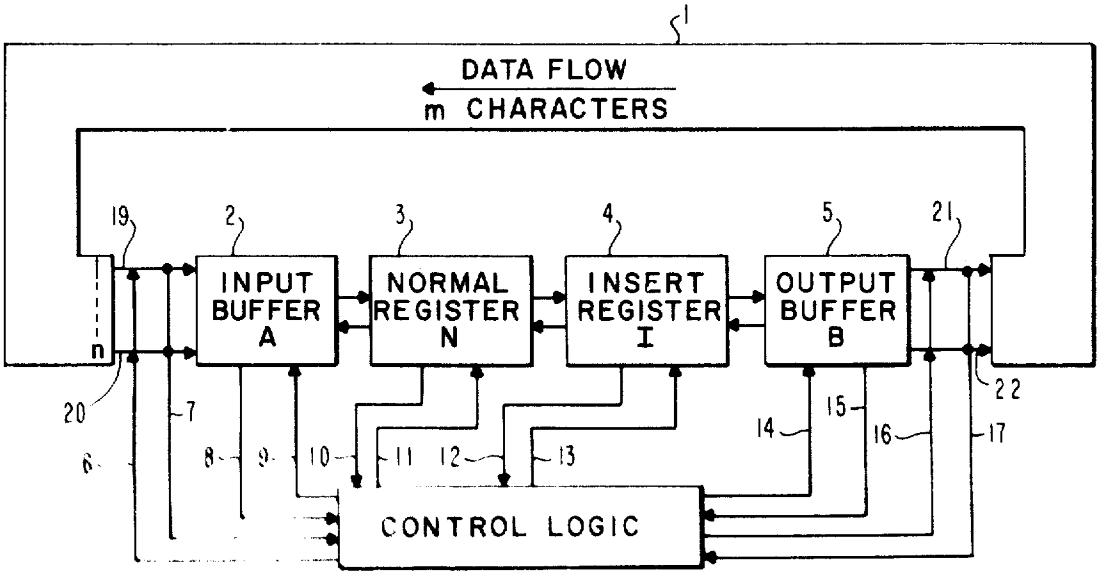
FIG. 2 is a generalized block diagram showing a shift register with certain buffers connected between its input and output stages which are controlled by a control unit to accomplish alterations of data paths for time-wise shifting of the data for insertion or deletion of characters, flags, and codes.

Reference is now made to FIG. 2 wherein there is shown a generalized block diagram of a system being part of the above system and employing four registers between the input and output stages of a shift register. As shown, the shift register 1 is *m* characters in length and each character may be *n* bits in width. The data as depicted moves in a counter-clockwise direction, and comes out of the final stage on lines 19 and 20 and is applied to an input buffer 2. This buffer, during the subsequent description of data flow, to simplify the description, is labeled A. Buffers and registers subsequently to be described are also designated with briefing characters N, I, and B. The output from the shift register is also applied along line 7 to the control logic unit, and as shown the control logic unit can also apply data along line 6 to lines 19 and 20. In the subsequent description, while lines such as 6 and 7 are shown as single lines, it should be understood that there are actually as many lines as each character is wide. Input buffer 2 is also connected to normal register 3 and as shown can both provide data to normal register 3 and accept data from register 3 which is designated the N buffer. The input buffer 2 is also in two way communication with the control logic along lines 8 and 9 and as shown normal register 3 is likewise in two way communication with the control logic along lines 10 and 11. Further, as shown the normal register is in two way communication with insert register 4 which likewise is in two way communication along lines 12 and 13 with the control logic. Finally, insert register 4 is in two way communication with output buffer 5 which is also in two way communication along lines 14 and 15 with the control logic. Again, as shown the control logic is in two way communication with lines 21 and 22 along lines 16 and 17 which connect the input stage of the buffer to the control logic.

With this generalized block diagram, data flow is under the control of the control logic. The control logic as illustrated, 1) takes the data from the output stage of the shift register and channels it into the appropriate register A, N, I, or B to control timewise shifting, 2) applies data to the input stage of the register along lines 21 and 22, 3) takes data from the output of any register, or 4) causes data to be applied to any register to accomplish any of the required functions associated with the task to be performed. The generalized flow of FIG. 2 is shown merely to illustrate that the control logic accepts data from the various lines and buffers and channels the data to the appropriate register to cause insertion and deletion.

Figure 3:
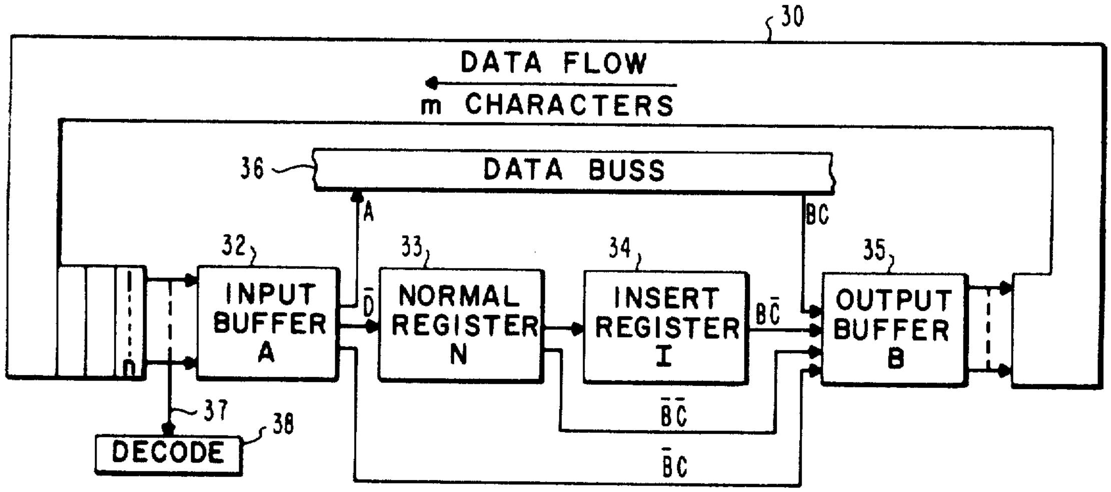
FIG. 3 is another block diagram illustrating the preferred embodiment of the subject novel shift register and control technique.

In FIG. 3 is shown a preferred embodiment of a system generally in accordance with the diagram of FIG. 2. The embodiment of FIG. 3 is much more efficient than the system of FIG. 2 in that the system of FIG. 3 does not directly control the data flow by bringing the characters into the control logic. Instead by selective actuation of four logical lines the embodiment in FIG. 3 can cause the completion of editoral tasks such as insertion of characters, deletion of characters and codes, error correct backspace, and other functions normally found in revision systems.

As shown in FIG. 3, a shift register 30 has a data flow in the counter-clockwise direction such that the output of the shift register is applied to an input buffer 32 again labeled A. The output from the shift register is also applied along line 37 to a decode unit 38 which decodes the characters and provides an indication to the control logic, not shown, as to which characters are at the output of the shift register. The output from the input buffer A can be applied under logical control to line $\overline{B}$C which causes the data to flow from input buffer A to an output buffer 35. Additionally, data from the input buffer 32 may be applied along line $\overline{D}$ to normal register 33.

Input buffer 32 is also, as shown, connected along line A to a data buss 36. Data buss 36 in turn is connected along line BC to the output buffer 35. The data buss is shown in general form and its specific configuration will depend upon the type of apparatus connected to the shift register. That is, the data buss may in effect be the character output register and the input register of a typewriter. The normal register 33 is as shown connected along line $\overline{B}$ $\overline{C}$ to the output buffer 35 and is also connected to the insert register 34. The insert register 34 is also connected along line $B\bar{C}$ to the output buffer 35. These various lines such as $\bar{B}\ \bar{C}$ are labeled in accordance with the logical control signals which must be applied to control the flow of the data along the designated path.

Figure 4:
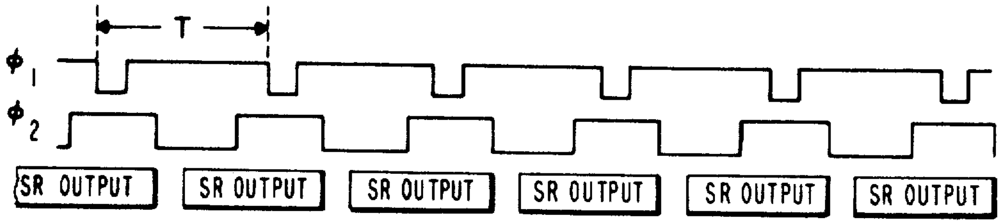
FIG. 4 is a timing diagram illustrating the timing of the two phase clock employed which causes data to shift and be set into the register along with an illustration of the time of valid shift register output.

FIG. 4 shows the basic timing employed in the shift register system. Shown is the output of a two phase clock $\phi_1$ and $\phi_2$; T illustrates the cycle time. The falling edge of $\phi_1$ is used to set data into the various buffers while the falling edge of $\phi_2$ defines the output of data from the shift register. As shown the shift register output is not available for a short time following the falling edge of the $\phi_2$ clock.

Figure 5:
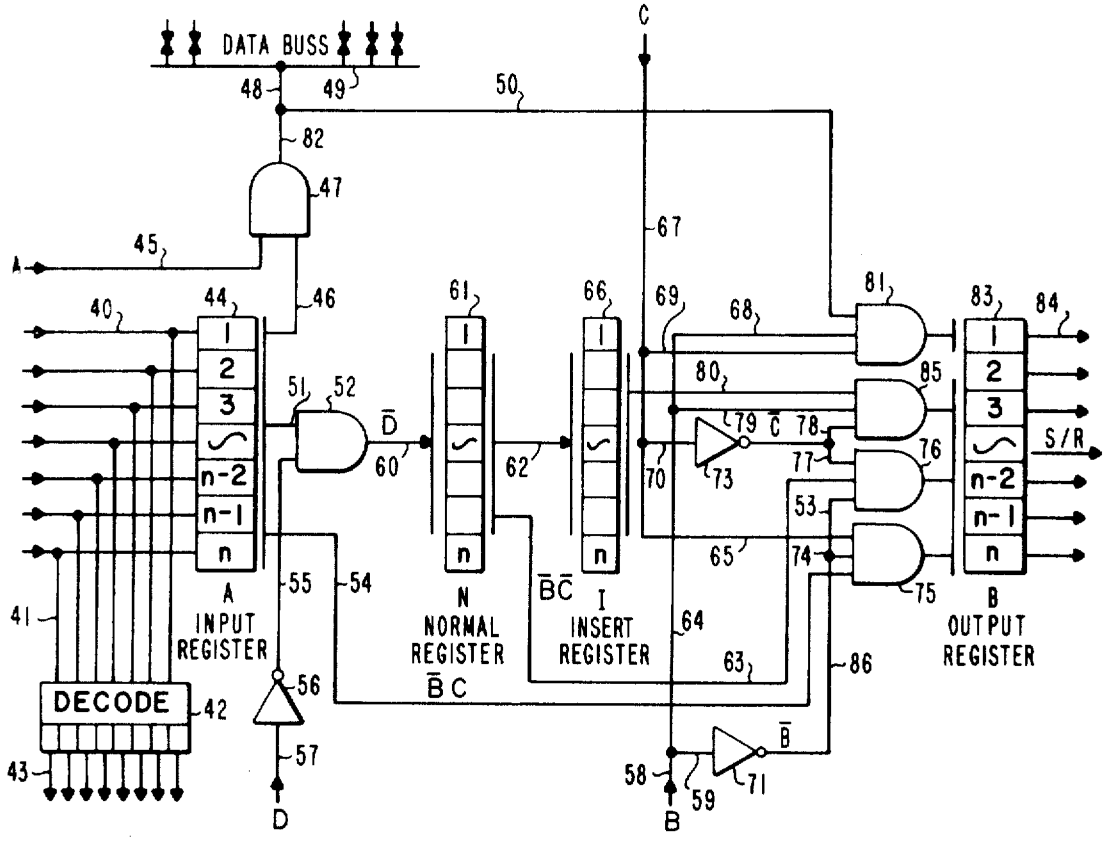
FIG. 5 is a detailed drawing of the preferred embodiment of the shift register of FIG. 2.

For a more detailed description of the subject shift register and control technique, and for an operative description thereof, reference is made to FIG. 5. In FIG. 5 are lines 40 which represent the output lines from the output stage of the shift register and lines 84 which are connected to the input stage of the shift register. Lines 40 from the output stage of the shift register are applied to the input register 44. The input register 44 is as shown for *n* stages. The output from the shift register applied to lines 40 is also applied along lines 41 to the decode unit 42 which has its output applied along lines 43 to the control logic (not shown). As previously discussed, decode unit 42 decodes the characters appearing on the output lines 40 and provides decoded information to the control logic. More specifically, as will later become apparent the codes and characters decoded by decode unit 42 include characters, dummy codes, delete codes, and operation, beginning of memory, and match flags.

The output from the input register 44 is as shown applied along line 46 to AND gate 47 which in turn receives the A logical input along line 45 from the control unit. Thus, application of a positive logic logical level to line 45 will cause the character appearing on line 40 to pass through AND gate 47 along lines 82 and 48 to the data buss 49. The data appearing on lines 40 is also applied along line 51 to AND gate 52 which receives another input along line 57 through inverter 56 and along line 55. Thus, application of a positive logical level to line 57 results in AND gate 52 inhibiting passage of data from the input register 44 onto line 60 and into the normal register 61. Application of a negative logical level or $\bar{D}$ to line 57, acting through inverter 56, causes line 55 to apply a positive logical level to AND gate 52 and thus allows the data from input register 44 to pass into normal register 61 along line 60.

The contents in the input register 44 are also applied along line 54 and to AND gate 75.

The contents of input register 44 which pass through AND gate 52 and along line 60 into the normal register 61 when a low logical level is applied to line 57 are applied along line 62 to the insert register 66. The same data also passes along line 63 to AND gate 76. The data in insert register 66 is also applied along line 80 to AND gate 85.

As shown, a C logical signal is applied along line 67 to lines 69, 70, and 65. Line 69 constitutes another input to AND gate 81, the signal applied to line 70 through inverter 73 is applied to both AND gates 85 and 76 along lines 78 and 77, respectively. The C logical signal applied along line 65 is also applied to AND gate 75. Further, the B logical signal which is applied to line 58 is also applied along lines 64 and 79 to make up the third input to AND gate 85, and along lines 64 and 68 to make up the third input to AND gate 81. The B logical signal is also applied along line 59, through inverter 71, and along lines 86 and 74 to AND gate 75, and along lines 86 and 53 to AND gate 76. The output of AND gates 75, 76, 81, and 85 are applied to the output register 83 which is connected to the input lines 84 of the shift register.

Thus, from the above it will be seen that application of a positive logical level to the D line 57 will result in the contents of the A input register 44 being inhibited from passing through AND gate 52 while application of a low logical level or $\bar{D}$ signal to line 57 will cause the contents of the input register 44 to be passed through AND gate 52 to the normal register 61. Further, the contents of the normal register 61 always are applied to the insert register 66 and are selectively gated into AND gate 85 by application of a positive logical level to line 58 which is the B logical signal along with the application of a low logical level to line 67 which is the C logical signal.

Thus, unless the B signal is true and the C signal not true the data in insert register 66 will not pass through AND gate 85 to the output register 83.

In addition, as previously described, when the A logical signal is true, the data from the input register 44 is passed through AND gate 47 to the data buss. For input from the data buss 49, AND gate 81 gates data from the data buss 49 along line 50. This will occur as shown when the B and C logical signals are true. Further, data can be gated directly from the normal register 61 along line 63 through AND gate 76 by application of the $\bar{C}$ signal to AND gate 76 in conjunction with the application of a $\bar{B}$ signal to line 58. The $\bar{B}$ signal is applied through inverter 71 and is inverted to cause the conditions into AND gate 76 to be met to pass the information from the normal register 61 into the output register 83. Finally, data from the input register 44 can be passed directly along line 54 through AND gate 75 by application of a $\bar{B}$ signal to line 58 in conjunction with the application of a C logical signal. This will cause the data to pass directly from the input register 44 into the output register 83.

The normal data path that the data takes when there is no data manipulation involved in the flow of data from the output stage to the input stage of the shift register is along lines 40, 51, 60, 63, and 84 in FIG. 5. As shown the normal data flow is from the output stage of the shift register to the A register, then along the $\bar{D}$ path to the N register, and then, bypassing the insert register, along the $\bar{B}\ \bar{C}$ path to the B register, and then into the input stage of the shift register.

Figure 6:
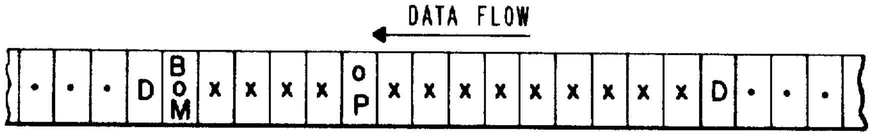
FIG. 6 is a drawing illustrating the shift register memory containing text data codes, a beginning of memory flag, and an operation flag.

The shift register is first loaded by an input operation with dummy codes from the data buss and then control codes are input into the shift register and written over the dummy codes. The control codes initially written into memory include operation and beginning of memory (BOM) flags. The operation flag defines the position of the next character and the operating point in memory for output and revision operations. Then data codes such as carrier return (CR) codes, and characters and spaces denoted by (x) are input into memory from a bulk store or from the I/O typewriter shown in FIG. 1. After the input operation the memory can be as shown in FIG. 6 with the data flow being to the left.

It will be assumed that the data to be input into the shift register memory is as shown in FIG. 7, but that due to an error in keying the data actually stored is as shown in FIG. 8. During an output operation where the data is printed out, these errors will be noted. In the first line of FIG. 8 "codes" has been misspelled twice.

The system of this invention provides means for rapidly and efficiently locating and retrieving the line to be revised. Noting a misspelled word, such as "codes" in the first line of FIG. 8, a search mode is entered by depressing a search key. Then characters representative of the revision point are sequentially keyed. That is, the characters "dodea" representative of the word as misspelled are sequentially keyed.

Referring to FIG. 9 in conjunction with FIGS. 1, 5, and 8, the first query character keyed on typewriter 101 is "d". This character is stored in query register 122 and compared, by comparison means not shown, with each character following a space code appearing on lines 40. When a search mode is entered the the character to be compared with the keyed query character is defined by a space. As will be more fully described later in the specification, when match flags exist in memory the character to be compared with a keyed query character is defined by a match flag. Characters and spaces (along with other codes and flags) are decoded by decode 42.

Figure 10:
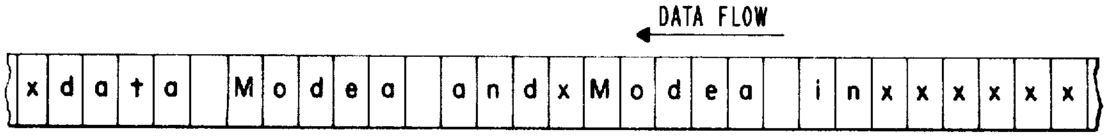
FIG. 10 is a drawing showing the shift register memory with the first matched characters replaced with match flags.

Each character following a space which matches the keyed query character "d" is detected in the input register and gated to the normal register. During this same bit or shift time positive logical signals are applied to the B line 58 and C line 67 and a match flag is gated into the output register from the data buss. For that portion of the text shown in FIG. 8, the first character of the first, second and fifth words is replaced with a match flag (FIG. 10). In the second line, the first character of the first and last words are replaced with match flags. For the third line, the first character of the third, fourth, and last words are replaced with match flags.

Referring again to FIG. 9, the next keyed query character is "o" and the next characters in memory which are compared with the query character are defined by match flags. This next keyed query character "o" is stored in query register 122 and the previously keyed query character "d" is transferred along line 124 to, and held in, hold register 123.

Figure 11:
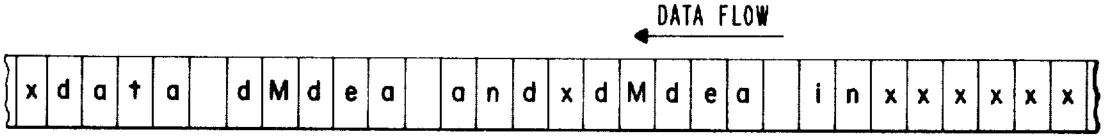
FIG. 11 is a drawing similar to FIG. 10 showing the second matched characters replaced with match flags.

For the query character "o" matches occur in the second and fifth words of line 1 (FIG. 11), the first and last words of line 2, and the fourth word of line 3.

The operation with respect to each word after match flags exist in memory involves (1) detecting the match flag, (2) replacing the match flag with the previously keyed character, (3) detecting the character following the match flag, and (4) replacing the character following the match flag with another match flag if it matches the query character stored in the query register 122. This operation can occur during the same memory revolution. This is accomplished first by applying positive logical signals to the B and C lines during the same bit time that the match flag is in the normal register and gating the previously keyed character to the output register from the data buss. The previously keyed character is first gated to the data buss from the hold register. Then if the next character in memory matches the keyed query character stored in the query register, positive logical signals are applied to the B and C lines and another match flag is gated to the output register from the data buss. After the entire memory has been scanned (corresponding characters following match flags in all words have been compared), the character in the query register is transferred to the hold register.

The above operational sequence continues until enough query characters have been keyed to identify the revision point or another operation is initiated. The extensiveness of the search can be only one character if desired.

Figure 12:
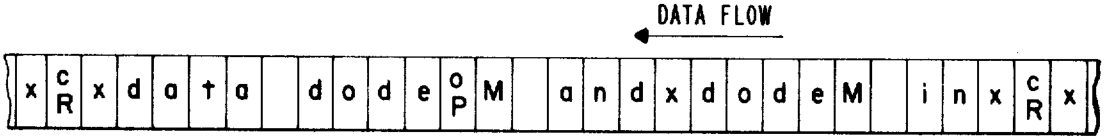
FIG. 12 is a drawing showing the shift register memory and the position to which the operation flag is moved when the keying operation is terminated.

When the search is terminated, the operation flag in memory (FIG. 6) is first repositioned before the first match flag in memory. This is accomplished by scanning the memory until the operation flag is detected. Then with the normal data flow being through the input, normal and output registers (FIG. 5), when the operation flag is in the normal register a low logical signal is applied to the B line 58 and positive logical signals are applied to the C line 67 and D line 57. The data codes following the operation flag then shift from the input register to the output register while the operation flag is held in the normal register. Thereafter, when a match flag is detected in the input register low logical signals are applied to the D, B, and C lines and the match flag is gated into the normal register. The normal data path is now restored and the memory is as shown in FIG. 12.

Figure 13:
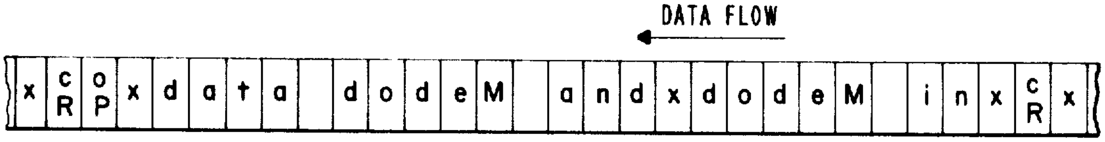
FIG. 13 is a drawing showing the shift register memory and the position to which the operation flag is moved for defining the first line containing a match flag.

With the operation flag now positioned before a match flag, the operation flag is to be repositioned at the beginning of the line as shown in FIG. 13. This is accomplished by scanning the memory and counting line termination codes, such as carrier return (CR) codes, from the BOM flag to the CR code following the operation flag. As described above, the operation flag is held in the normal register and the data flow is altered and is from the input to the output registers. Then when the BOM flag is again detected, a count of CR codes minus 1 is made. When the code following this CR code (count of CR codes minus 1) is detected in the input register the operation flag is gated to the output register and the normal data path is restored.

Figure 14:
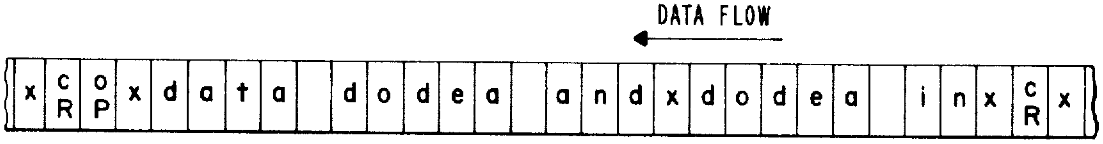
FIG. 14 is a drawing similar to FIG. 13 showing the shift register memory following the replacement of the match flags with the previously keyed character.

With the operation flag positioned at the beginning of the line, all match flags in that line are replaced with the previously keyed query character held in the hold register. The memory is now as shown in FIG. 14 and the line is printed out for revision purposes.

After printout of the line, it can be revised and the above operation of repositioning the operation flag can be repeated for subsequent lines containing match flags. When it is decided that the revision operation is to be terminated and match flags still exist in memory, they are replaced with the previously keyed query character.

Although reference above has been made to the use of a shift register system, the operations performed could be accomplished through the use of a random access memory, discs, drums, or other memory means.

Figure 15:
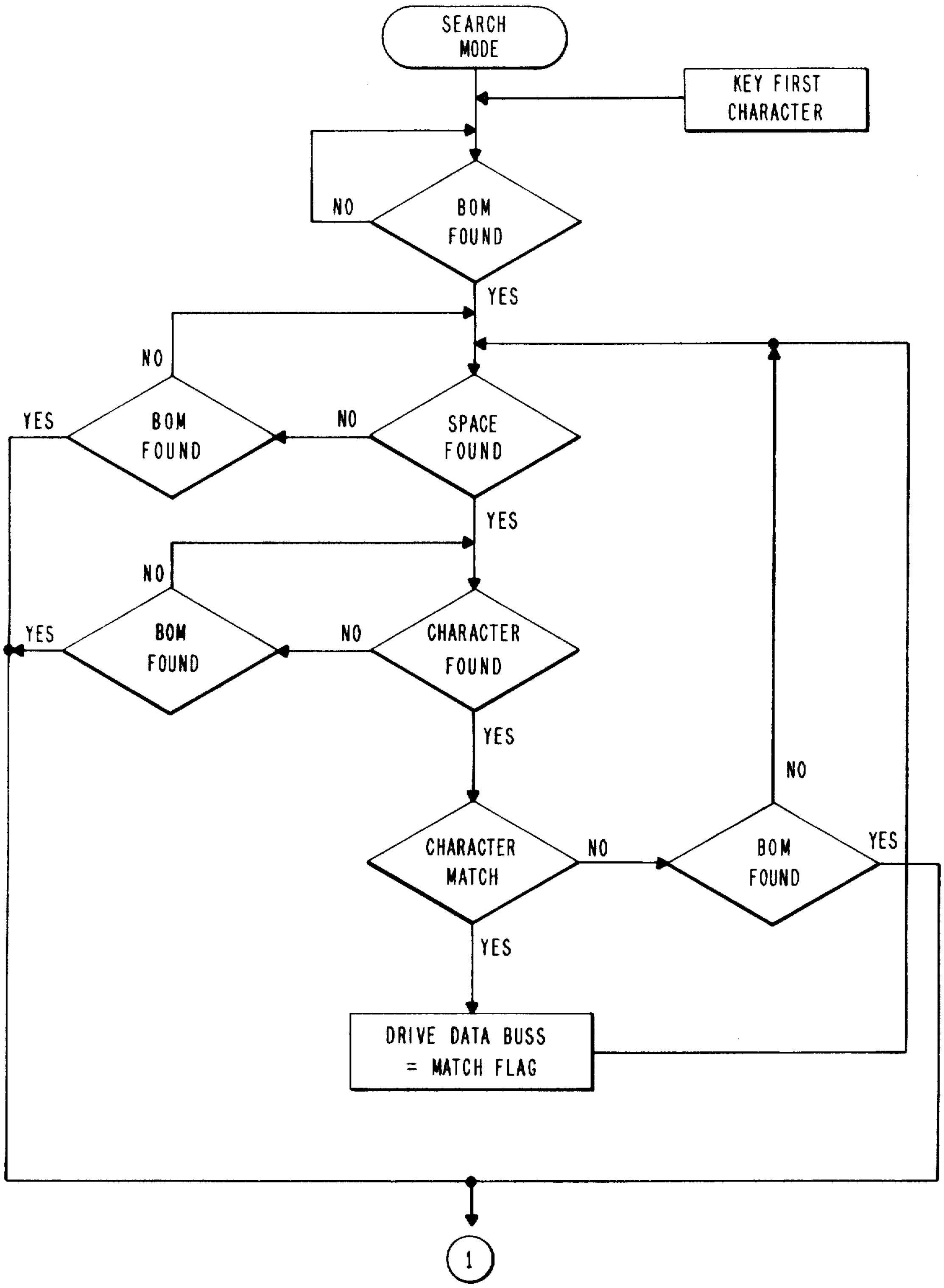
FIG. 15 is a flow chart illustrating the operation of the system when the first character is keyed upon entering a search mode.

The flow taken when the search mode is entered is depicted in FIG. 15. After the search mode is entered, the first query character is keyed. Then the memory is scanned for the BOM flag. After the BOM flag has been found, scanning continues until a space is found. When the first character following a space is found, it is compared with the keyed query character. If a match occurs, the character in memory is replaced with a match flag. If the character was not a match, the next space is looked for and when found another comparison is made. After either event (a character does not match or the character is replaced with a match flag), the next space is sought. When the beginning of memory flag is again found, indicating that all characters following a space have been compared with the keyed query character, the flow is as shown in FIG. 16.

Figure 16:
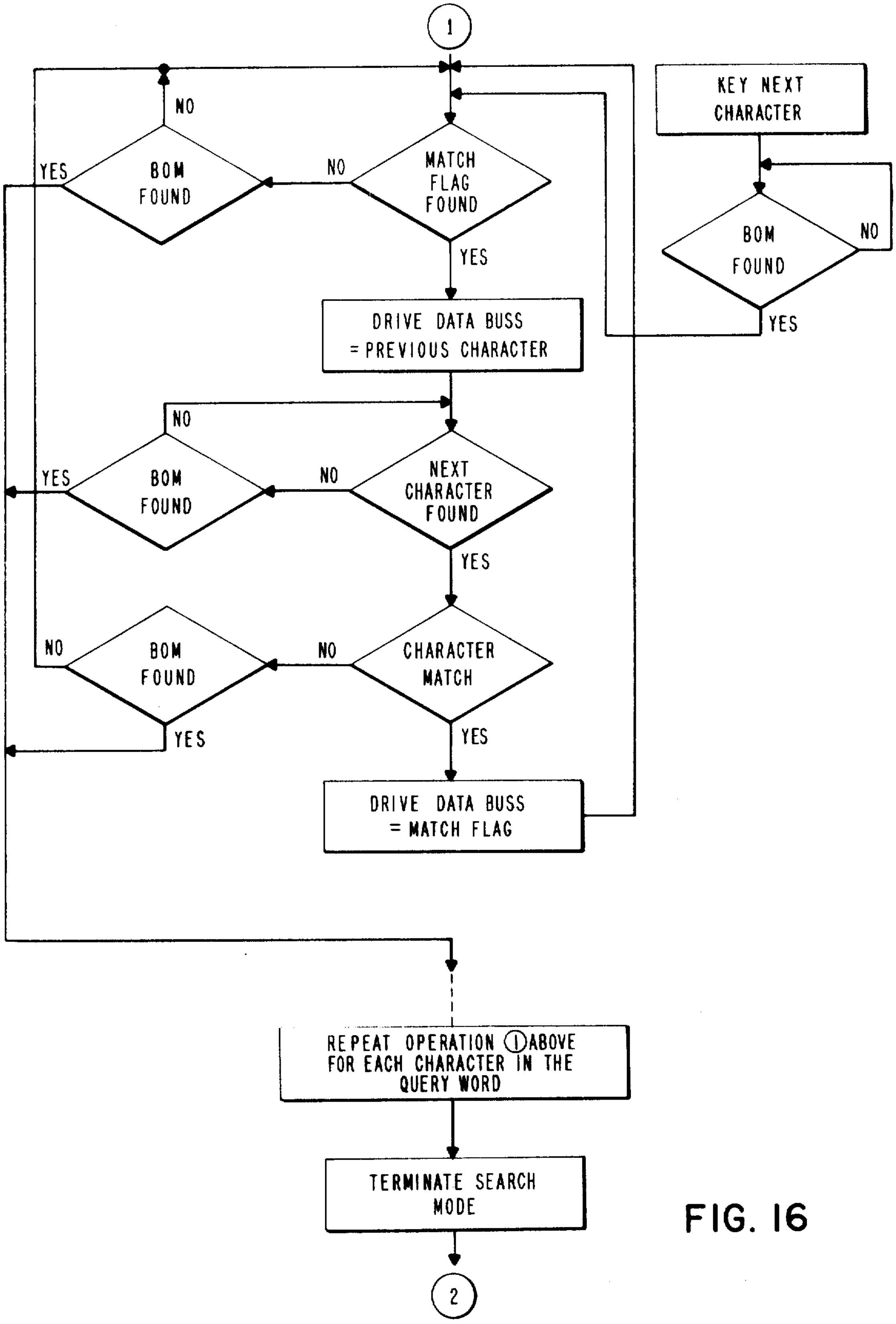
FIG. 16 is a flow chart illustrating the operation of the system when subsequent characters are keyed.
Figure 17:
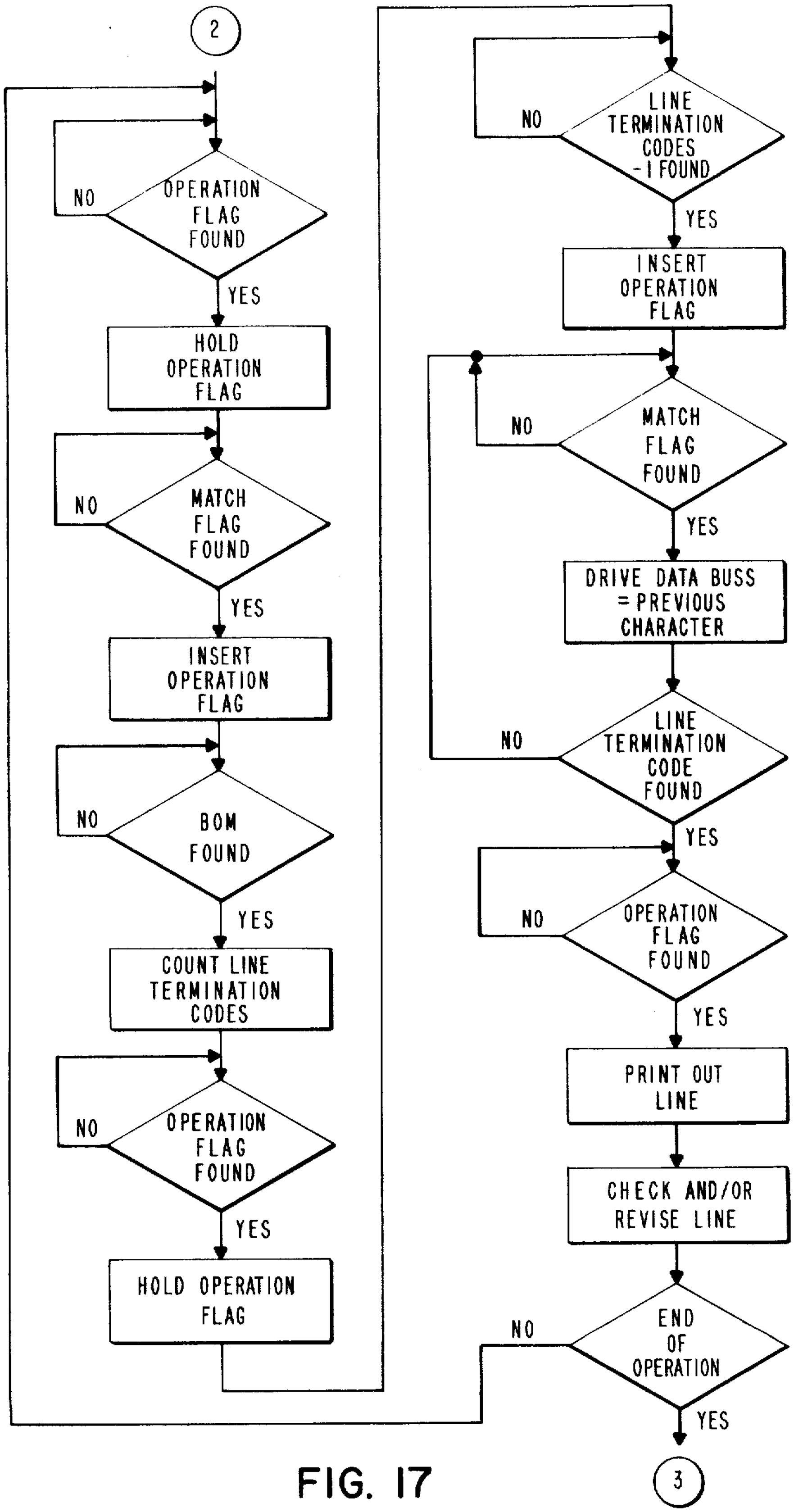
FIG. 17 is a flow chart illustrating the operation of positioning the operation flag at the first following match flag in memory, the repositioning of the operation flag at the beginning of the line containing the first match flag, the printout of the line, and the checking and revising of the line.

In FIG. 16, the next query character is keyed and the BOM flag is sought. This time, only match flags are to be detected and only the characters following match flags are to be compared with the keyed query character. The match flags when detected are replaced with the previously keyed query character. The next character is compared and if a match occurs, the matched character in memory is replaced with another match flag. This operation is repeated as long as query characters are keyed. After the search mode has been terminated, the flow is as shown in FIG. 17.

The operation flag is now to be positioned at the beginning of the first line containing a match flag following the BOM flag. The memory is scanned until the operation flag is found and scanning continues until a match flag is found. The operation flag is repositioned before the match flag and the beginning of memory is again sought. During this scan, line termination codes are counted, and when the operation flag is detected it is held and the termination code following the operation flag is also counted. The memory is again scanned and line termination codes are counted up to the previous count minus 1. The operation flag is then allowed to re-enter the data flow. The operation flag is now positioned at the beginning of the first line containing a match flag. Then as match flags are detected in the line, they are replaced with the previously keyed character. The line has now been restored to its original form. The memory is again scanned until the operation flag is found. Then the line is printed out for revision purposes. After all operations are performed relative to that line, the flow is as shown in FIG. 18.

Figure 18:
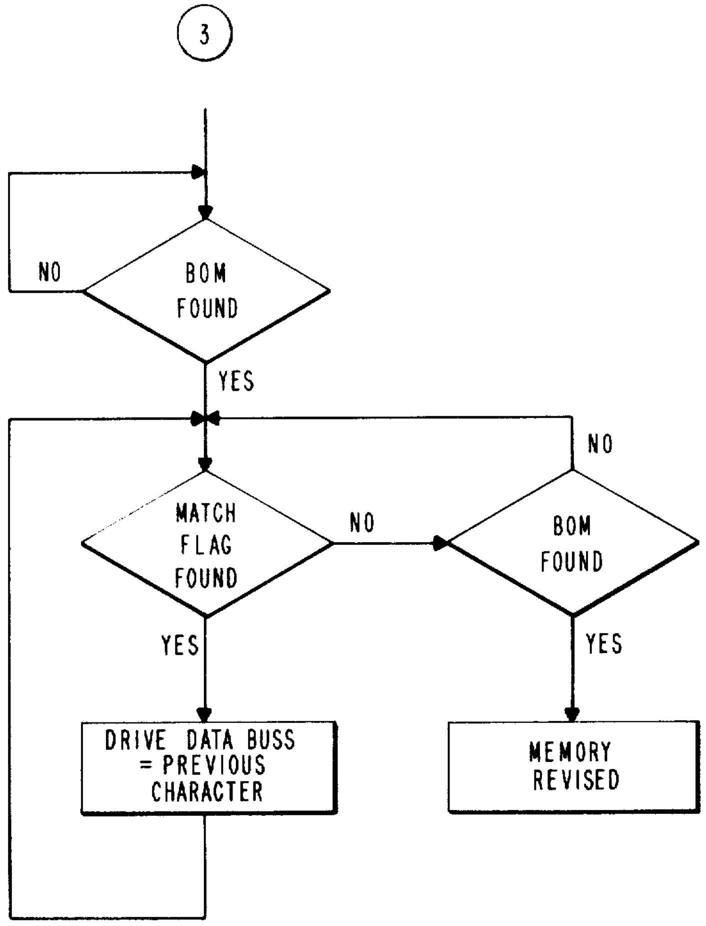
FIG. 18 is a flow chart illustrating the operation of clearing the memory of all match flags after the desired line has been revised.

As shown in FIG. 18 if all revision operations are completed or are to be terminated, the beginning of memory is sought and all following match flags are replaced with the previously keyed query character.

In summary, a system is provided for locating and retrieving revision lines from text stored in a storage means. The search mode is entered into and query characters are keyed which are representative of a revision point in the line. These query characters are compared sequentially with corresponding characters stored in memory. When corresponding matches occur, they are replaced with control codes (such as match flags). Thereafter upon the subsequent generation of query characters and the occurrence of matches, the control codes are replaced with the previously keyed characters and new control codes replace subsequent matches. When the search is terminated, the line containing the first match flag is printed out for revision purposes.

While the invention has been particularly shown and described with reference to a particular embodiment, it will be understood by those skilled in the art that various changes in form and detail may be made without departing from the spirit and scope of the invention.

What is claimed is:

1. A system for locating a particular line of characters stored in a storage means along with a number of lines of characters, said system comprising:

a. means for sequentially generating a number of query characters representative of a number of characters making up said particular line of characters;

b. means connected to said storage means and to said means for sequentially generating said query characters for sequentially detecting corresponding characters in all said lines corresponding to said sequentially generated query characters;

c. means connected to said storage means for selectively replacing said corresponding characters with control codes;

d. means connected to said storage means for sequentially replacing said control codes with said corresponding characters as long as said query characters are generated; and e. means connected to said storage means for detecting one of said lines containing at least one control code after said generating of said query characters is terminated.

2. A system according to claim 1 wherein said lines of characters stored in said storage means comprise text lines.

3. A system according to claim 1 wherein said characters stored in said storage means comprise text characters and spaces.

4. A system according to claim 3 further including means connected to said storage means for outputting one of said lines containing at least one control code after said generating of said query characters is terminated.

5. A system for locating and retrieving a revision line stored in a storage means along with a number of lines of text, said system comprising:

a. means for sequentially generating a number of query characters representative of a number of characters making up said line;

b. means for sequentially detecting corresponding characters in said text corresponding to said sequentially generated query characters;

c. means for selectively replacing said corresponding characters with control codes;

d. means for sequentially replacing said control codes with said corresponding characters as long as said query characters are generated;

e. means for detecting one of said lines containing at least one control code after said generating of said query characters is terminated; and f. means for outputting said one of said lines.

6. A system according to claim 5 further including means for detecting all of said lines containing at least one control code.

7. A system according to claim 5 further including means for revising said lines containing at least one control code.

8. A system according to claim 7 further including means for replacing all control codes with said corresponding characters.

9. A system according to claim 5 further including a first means for holding said query characters when generated.

10. A system according to claim 9 further including a second means for holding said query characters after said corresponding characters in said text are replaced with said control codes.

11. A system according to claim 10 further including means for transferring said query characters from said first means to said second means when another query character is generated.

* * * * *